(12) United States Patent  
Li et al.

(10) Patent No.: US 11,009,605 B2  
(45) Date of Patent: May 18, 2021

(54) MEMS BEAM STEERING AND FISHEYE RECEIVING LENS FOR LIDAR SYSTEM

(71) Applicant: INNOVUSION IRELAND LIMITED, Los Altos, CA (US)

(72) Inventors: Yimin Li, Los Altos, CA (US); Junwei Bao, Los Altos, CA (US)

(73) Assignee: INNOVUSION IRELAND LIMITED, Los Altos, CA (US)

( * ) Notice: Subject to any disclaimer, the term of this patent is extended or adjusted under 35 U.S.C. 154(b) by 398 days.

(21) Appl. No.: 15/857,566

(22) Filed: Dec. 28, 2017

(65) Prior Publication Data

US 2019/0025428 A1 Jan. 24, 2019

Related U.S. Application Data

(60) Provisional application No. 62/442,728, filed on Jan. 5, 2017.

(51) Int. Cl.
| | |
|---|---|
| *G01S 17/10* | (2020.01) |
| *G01S 7/481* | (2006.01) |
| *G01S 7/486* | (2020.01) |
| *G01S 17/42* | (2006.01) |

(52) U.S. Cl.
CPC ............. *G01S 17/10* (2013.01); *G01S 7/486* (2013.01); *G01S 7/4816* (2013.01); *G01S 7/4817* (2013.01); *G01S 7/4868* (2013.01); *G01S 17/42* (2013.01)

(58) Field of Classification Search
CPC ........ G01S 17/10; G01S 7/4816; G01S 7/486; G01S 17/42; G01S 7/4817; G01S 7/4868
USPC ....................................................... 356/5.01
See application file for complete search history.

(56) References Cited

U.S. PATENT DOCUMENTS

| | | |
|---|---|---|
| 5,006,721 A | 4/1991 | Cameron |
| 5,157,451 A | 10/1992 | Taboada |
| 5,442,358 A | 8/1995 | Keeler |
| 5,657,077 A | 8/1997 | Deangelis |
| 5,926,259 A | 7/1999 | Bamberger |

(Continued)

FOREIGN PATENT DOCUMENTS

| | | |
|---|---|---|
| GB | 2000411 A | 1/1979 |
| WO | 2018129408 A1 | 7/2018 |

(Continued)

OTHER PUBLICATIONS

International Search Report and Written Opinion, dated Jan. 17, 2020, for PCT Application No. PCT/US19/19276, 14 pages.

(Continued)

*Primary Examiner* — Daniel L Murphy  
(74) *Attorney, Agent, or Firm* — Morrison & Foerster LLP (57) ABSTRACT

The present disclosure describes a system and method for a binocular LiDAR system. The system includes a light source, a beam steering apparatus, a receiving lens, a light detector. The light source is configured to transmit a pulse of light. The beam steering apparatus is configured to steer the pulse of light in at least one of vertical and horizontal directions along an optical path. The lens is configured to direct the collected scattered light to the light detector. The electrical processing and computing device is electrically coupled to light source and the light detector. The light detector is configured to minimize the background noise. The distance to the object is based on a time difference between transmitting the light pulse and detecting scattered light.

16 Claims, 4 Drawing Sheets

A Fisheye Binocular Lidar Configuration

(56) References Cited

U.S. PATENT DOCUMENTS

| | | | |
|---|---|---|---|
| 6,163,378 A | 12/2000 | Khoury | |
| 6,594,000 B2 | 7/2003 | Green | |
| 6,650,404 B1 | 11/2003 | Crawford | |
| 6,950,733 B2 | 9/2005 | Stopczynski | |
| 7,202,941 B2 | 4/2007 | Munro | |
| 7,440,084 B2 | 10/2008 | Kane | |
| 7,440,175 B2 | 10/2008 | Di Teodoro | |
| 7,489,865 B2 | 2/2009 | Varshneya | |
| 7,576,837 B2 | 8/2009 | Liu | |
| 7,830,527 B2 | 11/2010 | Chen | |
| 7,835,068 B1 | 11/2010 | Brooks | |
| 7,847,235 B2 | 12/2010 | Krupkin | |
| 7,936,448 B2 | 5/2011 | Albuquerque | |
| 7,969,558 B2 | 6/2011 | Hall | |
| 7,982,861 B2 | 7/2011 | Abshire | |
| 8,072,582 B2 | 12/2011 | Meneely | |
| 8,471,895 B2 | 6/2013 | Banks | |
| 8,736,818 B2 | 5/2014 | Weimer | |
| 8,749,764 B2 | 6/2014 | Hsu | |
| 8,812,149 B2 | 8/2014 | Doak | |
| 9,048,616 B1 | 6/2015 | Robinson | |
| 9,086,273 B1 | 7/2015 | Gruver | |
| 9,194,701 B2 | 11/2015 | Bösch | |
| 9,255,790 B2 | 2/2016 | Zhu | |
| 9,300,321 B2 | 3/2016 | Zalik | |
| 9,354,485 B2 | 5/2016 | Fermann | |
| 9,510,505 B2 | 12/2016 | Halloran | |
| 9,575,184 B2 | 2/2017 | Gilliland | |
| 9,605,998 B2 | 3/2017 | Nozawa | |
| 9,621,876 B2 | 4/2017 | Federspiel | |
| 9,638,799 B2 | 5/2017 | Goodwin | |
| 9,696,426 B2 | 7/2017 | Zuk | |
| 9,702,966 B2 | 7/2017 | Batcheller | |
| 9,823,353 B2 | 11/2017 | Eichenholz | |
| 9,869,754 B1 | 1/2018 | Campbell | |
| 9,880,263 B2 | 1/2018 | Droz | |
| 9,885,778 B2 | 2/2018 | Dussan | |
| 9,915,726 B2 | 3/2018 | Bailey | |
| 9,927,915 B2 | 3/2018 | Frame | |
| 10,073,166 B2 | 9/2018 | Dussan | |
| 10,157,630 B2 | 12/2018 | Vaughn | |
| 10,215,847 B2 | 2/2019 | Scheim | |
| 10,557,923 B2 | 2/2020 | Watnik | |
| 10,591,600 B2 | 3/2020 | Villeneuve | |
| 2002/0136251 A1 | 9/2002 | Green | |
| 2004/0135992 A1 | 7/2004 | Munro | |
| 2005/0033497 A1 | 2/2005 | Stopczynski | |
| 2006/0071846 A1 | 4/2006 | Yanagisawa et al. | |
| 2006/0132752 A1 | 6/2006 | Kane | |
| 2007/0091948 A1 | 4/2007 | Di Teodoro | |
| 2008/0174762 A1 | 7/2008 | Liu | |
| 2009/0010644 A1 | 1/2009 | Varshneya | |
| 2009/0051926 A1 | 2/2009 | Chen | |
| 2009/0059201 A1 | 3/2009 | Willner | |
| 2009/0147239 A1 | 6/2009 | Zhu | |
| 2009/0262760 A1 | 10/2009 | Krupkin | |
| 2010/0006760 A1 | 1/2010 | Lee | |
| 2010/0020306 A1 | 1/2010 | Hall | |
| 2010/0027602 A1 | 2/2010 | Abshire | |
| 2010/0045965 A1 | 2/2010 | Meneely | |
| 2010/0128109 A1 | 5/2010 | Banks | |
| 2010/0271614 A1 | 10/2010 | Albuquerque | |
| 2012/0038903 A1 | 2/2012 | Weimer | |
| 2012/0124113 A1 | 5/2012 | Zalik | |
| 2012/0221142 A1 | 8/2012 | Doak | |
| 2013/0107016 A1 | 5/2013 | Federspiel | |
| 2013/0293867 A1 | 11/2013 | Hsu | |
| 2013/0293946 A1 | 11/2013 | Fermann | |
| 2014/0078514 A1 | 3/2014 | Zhu | |
| 2014/0347650 A1 | 11/2014 | Bosch | |
| 2014/0350836 A1 | 11/2014 | Stettner et al. | |
| 2015/0078123 A1 | 3/2015 | Batcheller | |
| 2015/0084805 A1 | 3/2015 | Dawber | |
| 2015/0116692 A1 | 4/2015 | Zuk | |
| 2015/0139259 A1 | 5/2015 | Robinson | |
| 2015/0355327 A1 | 12/2015 | Goodwin | |
| 2016/0003946 A1 | 1/2016 | Gilliland | |
| 2016/0047896 A1 | 2/2016 | Dussan | |
| 2016/0047900 A1 | 2/2016 | Dussan | |
| 2016/0061655 A1 | 3/2016 | Nozawa | |
| 2016/0061935 A1 | 3/2016 | Mccloskey et al. | |
| 2016/0100521 A1 | 4/2016 | Halloran | |
| 2016/0117048 A1 | 4/2016 | Frame | |
| 2016/0245902 A1 | 8/2016 | Watnik | |
| 2016/0291134 A1 | 10/2016 | Droz | |
| 2016/0313445 A1 | 10/2016 | Bailey | |
| 2016/0327646 A1 | 11/2016 | Scheim | |
| 2017/0153319 A1 | 6/2017 | Villeneuve | |
| 2017/0299721 A1 | 10/2017 | Eichenholz | |
| 2018/0158471 A1 | 6/2018 | Vaughn | |
| 2018/0188355 A1 | 7/2018 | Bao | |
| 2018/0188357 A1 | 7/2018 | Li | |
| 2018/0188358 A1 | 7/2018 | Li | |
| 2018/0188371 A1 | 7/2018 | Bao | |
| 2018/0275274 A1 | 9/2018 | Bao | |
| 2019/0025428 A1 | 1/2019 | Li | |
| 2019/0120942 A1 | 4/2019 | Zhang | |
| 2019/0257924 A1 | 8/2019 | Li | |
| 2019/0265334 A1 | 8/2019 | Zhang | |
| 2019/0265336 A1 | 8/2019 | Zhang | |
| 2019/0265337 A1 | 8/2019 | Zhang | |
| 2019/0265339 A1 | 8/2019 | Zhang | |

FOREIGN PATENT DOCUMENTS

| | | | |
|---|---|---|---|
| WO | 2018129409 A1 | 7/2018 | |
| WO | 2018129410 A1 | 7/2018 | |
| WO | 2018175990 A1 | 9/2018 | |
| WO | 2018182812 A2 | 10/2018 | |
| WO | 2019079642 A1 | 4/2019 | |
| WO | WO2019165095 A1 | 8/2019 | |
| WO | WO2019165289 A1 | 8/2019 | |
| WO | WO2019165294 A1 | 8/2019 | |
| WO | 2020013890 A2 | 1/2020 | |

OTHER PUBLICATIONS

Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.

Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., six pages.

International Preliminary Report on Patentability and Written Opinion of the International Searching Authority, dated Sep. 18, 2018, for PCT Application No. PCT/US2018/12116, filed Jan. 2, 2018, 11 pages.

International Preliminary Report on Patentability, and Written Opinion dated Jul. 9, 2019, for PCT Application No. PCT/US2018/012703, filed Jan. 5, 2018, 10 pages.

International Preliminary Report on Patentability, dated Jul. 9, 2019, for PCT Application No. PCT/US2018/012704, filed Jan. 5, 2018, 7 pages.

International Preliminary Report on Patentability, dated Jul. 9, 2019, for PCT Application No. PCT/US2018/012705, filed Jan. 5, 2018, 7 pages.

International Search Report and Written Opinion, dated Jul. 9, 2019, for PCT Application No. PCT/US2019/18987, 17 pages.

International Search Report and Written Opinion, dated May 3, 2019, for PCT Application No. PCT/US2019/19272, 16 pages.

International Search Report and Written Opinion, dated May 6, 2019, for PCT Application No. PCT/US2019/19264, 15 pages.

International Search Report and Written Opinion, dated Jan. 3, 2019, for PCT Application No. PCT/US2018/056577, nine pages.

International Search Report, dated Jun. 7, 2018, for PCT Application No. PCT/US2018/24185, filed Mar. 23, 2018, 2 pages.

International Search Report, dated Mar. 19, 2018, for PCT Application No. PCT/US2018/012705, filed Jan. 5, 2018, 2 pages.

(56) References Cited

OTHER PUBLICATIONS

International Search Report, dated Mar. 20, 2018, for PCT Application No. PCT/US2018/012703, filed Jan. 5, 2018, 2 pages.
International Search Report, dated Mar. 23, 2018, for PCT Application No. PCT/US2018/012704, filed Jan. 5, 2018, 2 pages.
International Search Report, dated Sep. 18, 2018, for PCT Application No. PCT/US2018/12116, filed Jan. 2, 2018, 2 pages.
Written Opinion of the International Searching Authority, dated Jun. 7, 2018, for PCT Application No. PCT/US2018/24185, filed Mar. 23, 2018, 5 pages.
Written Opinion of the International Searching Authority, dated Mar. 19, 2018, for PCT Application No. PCT/US2018/012705, filed Jan. 5, 2018, 6 pages.
Written Opinion of the International Searching Authority, dated Mar. 20, 2018, for PCT Application No. PCT/US2018/012703, filed Jan. 5, 2018, 9 pages.
Written Opinion of the International Searching Authority, dated Mar. 23, 2018, for PCT Application No. PCT/US2018/012704, filed Jan. 5, 2018, 6 pages.
EP2889642 Description translation, created Oct. 3, 2020 from application dated Nov. 11, 2014, 27 pp. (Year: 2020).
Final Office Action dated Oct. 8, 2020, for U.S. Appl. No. 15/857,563, filed Dec. 28, 2017, thirteen pages.
International Preliminary Report on Patentability dated Apr. 30, 2020, for PCT Application No. PCT/US2018/056577, eight pages.
Non-Final Office Action dated Apr. 30, 2020, for U.S. Appl. No. 15/860,598, filed Jan. 2, 2018, thirteen pages.
Non-Final Office Action dated Jun. 2, 2020, for U.S. Appl. No. 15/934,807, filed Mar. 23, 2018, thirteen pages.
Non-Final Office Action dated Mar. 26, 2020, for U.S. Appl. No. 15/857,563, filed Dec. 28, 2017, twenty three pages.
Non-Final Office Action dated Mar. 30, 2020, for U.S. Appl. No. 15/863,695, filed Jan. 5, 2018, eight pages.
European Search Report, dated Jul. 17, 2020, for EP Application No. 18776977.3, twelve pages.
Extended European Search Report, dated Jul. 10, 2020, for EP Application No. 18736738.8, nine pages.
Gunzung, Kim, et al. (Mar. 2, 2016). "A hybrid 3D LIDAR imager based on pixel-by-pixel scanning and DS-OCDMA," Proceedings of SPIE; [Proceedings of SPIE ISSN 0277-786X vol. 10524], SPIE, US, vol. 9751, pp. 975119-1-975119-8.
Extended European Search Report, dated Jul. 22, 2020, for EP Application No. 18736685.1, ten pages.
Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, pp. 983203-983203.
Non-Final Office Action dated Feb. 18, 2021, for U.S. Appl. No. 15/860,598, filed Jan. 2, 2018, thirteen pages.
Notice of Allowance dated Dec. 2, 2020, for U.S. Appl. No. 15/863,695, filed Jan. 5, 2018, five pages.
Notice of Allowance, (corrected) dated Jan. 8, 2021, for U.S. Appl. No. 15/863,695, filed Jan. 5, 2018, two pages.

Fig.1 A Fisheye Binocular Lidar Configuration

Fig. 2 Segmentation of Detector and Relation to Target Spot

Fig. 3

Fig. 4 Extinction coefficient of air with (red) and without (black) aerosols vs wavelength for a midlatitude summer (MLS) Navy maritime environment with 50-km visibility. The extinction coefficient was generated using MODTRAN.

MEMS BEAM STEERING AND FISHEYE RECEIVING LENS FOR LIDAR SYSTEM

CROSS-REFERENCE TO RELATED APPLICATIONS

This application claims priority to U.S. Provisional Patent Application No. 62/442,728, entitled "MEMS BEAM STEERING AND FISHEYE RECEIVING LENS FOR LiDAR SYSTEM", filed on Jan. 5, 2017, the content of which is hereby incorporated by reference in its entirety.

FIELD OF THE DISCLOSURE

The present disclosure generally relates to a light detection and ranging (LiDAR) system and, more specifically, to systems and methods for steering consecutive light pulses to illuminate objects in a field of view and binocularly collecting the scattered light from each light pulse for ranging the objects in the field of view.

BACKGROUND OF THE DISCLOSURE

LiDAR systems can be used to measure the distance between an object and the system. Specifically, the system can transmit a signal (e.g., using a light source), record a returned signal (e.g., using light detectors), and determine the distance by calculating the delay between the returned signal and the transmitted signal.

SUMMARY OF THE DISCLOSURE

The following presents a simplified summary of one or more examples in order to provide a basic understanding of the disclosure. This summary is not an extensive overview of all contemplated examples, and is not intended to either identify key or critical elements of all examples or delineate the scope of any or all examples. Its purpose is to present some concepts of one or more examples in a simplified form as a prelude to the more detailed description that is presented below.

In accordance with some embodiments, a method for light detection and ranging (LiDAR) scanning detection is provided. The method includes transmitting a pulse of light from a light source; steering the pulse of light at an object along an optical path; collecting scattered light from the pulse of light dispersed from the object; converging the scattered light onto a light detector; and determining a distance to the object based on a time difference between transmitting the light pulse and detecting the scattered light. While the description below uses a vehicle as an example, the centralized laser delivery system and multiple LiDARs can be disposed in or integrated with robots, multiple locations of a building for security monitoring purposes, or intersections or certain location of roads for traffic monitoring, and so on.

In accordance with some embodiments, a light detection and ranging (LiDAR) scanning system is provided. The system includes: a light source configured to transmit a light pulse; a beam steering apparatus configured to steer the light pulse in at least one of vertical and horizontal directions along an optical path; a light converging apparatus configured to direct the collected scattered light to a focal plane; a light detector disposed at or in proximity to the focal plane, wherein the light detector comprises a plurality of detector segments; and an electrical processing and computing device. The electrical processing and computing device is configured to: based on the steering of the light pulse, select a subset of the plurality of detector segments; deactivate a particular detector segment of the plurality of detector segments, wherein the detector segment is not part of the subset of the plurality of detector segments; and detect, using the selected subset of the plurality of detector segments, a scattered light generated based on the light pulse illuminating an object in the optical path.

In accordance with some embodiments, a computer-implemented method for operating a light detection and ranging (LiDAR) system, which includes a light source, a beam steering apparatus, and a light detector having a first detector segment and a second detector segment, comprises: transmitting, with the light source, a light pulse; steering, with the beam steering apparatus, the light pulse in at least one of vertical and horizontal directions along an optical path; directing, with the light converging apparatus, the collected scattered light to a focal plane; based on the steering of the light pulse, selecting a subset of the plurality of detector segments; and detecting, using the selected subset of the plurality of detector segments, a scattered light generated based on the light pulse illuminating an object in the optical path.

BRIEF DESCRIPTION OF THE DRAWINGS

For a better understanding of the various described aspects, reference should be made to the description below, in conjunction with the following figures in which like-referenced numerals refer to corresponding parts throughout the figures.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Examples of LiDAR systems and processes will now be presented with reference to various elements of apparatuses and methods. These apparatuses and methods will be described in the following detailed description and illustrated in the accompanying drawings by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

In the following description of examples, reference is made to the accompanying drawings which form a part hereof, and in which is shown by way of illustration specific examples that can be practiced. It is to be understood that other examples can be used and structural changes can be made without departing from the scope of the disclosed examples.

Although the following description uses terms "first," "second," etc. to describe various elements, these elements should not be limited by the terms. These terms are only used to distinguish one element from another. For example, a first pulse signal could be termed a second pulse signal, and, similarly, a second pulse signal could be termed a first pulse signal, without departing from the scope of the various described embodiments. The first pulse signal and the second pulse signal are both pulse signals, but they may not be the same pulse signal.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

In order to reduce the size of LiDAR systems, using micro-electro-mechanical systems (MEMS) to project laser beam is a desirable choice. Such on-chip solutions reduce the size of the LiDAR system. However, these on-chip MEMS designs yield an optical aperture cross-section that is a few (e.g., less than 5) millimeters or less in a coaxial receiving scheme, which limits the visibility of the LiDAR system. It has been found that a larger optical aperture cross-section boosts the collection efficiency of scattered light. A collection lens with wide acceptance angle, e.g., fisheye lens, and a large area photo detector with fast speed and high sensitivity is needed to avoid mechanically tuning optics in a receiving path. However, this will also increase the amount of background light, and thus noise, entering the receiving system. As such, it is desired to increase the cross-section collection optical aperture of a LiDAR system while lowering the background noise floor.

The present disclosure describes a binocular MEMS steering system for LiDAR. The LiDAR system can include a laser source that emits or transmits laser light (e.g., laser pulses), a beam steering apparatus, a light converging apparatus, a light detector, and/or an electrical processing and computing device (e.g., a microprocessor). As discussed below, these components of the LiDAR system may be configured to operate with MEMS designs in an optimal way.

Figure 3:
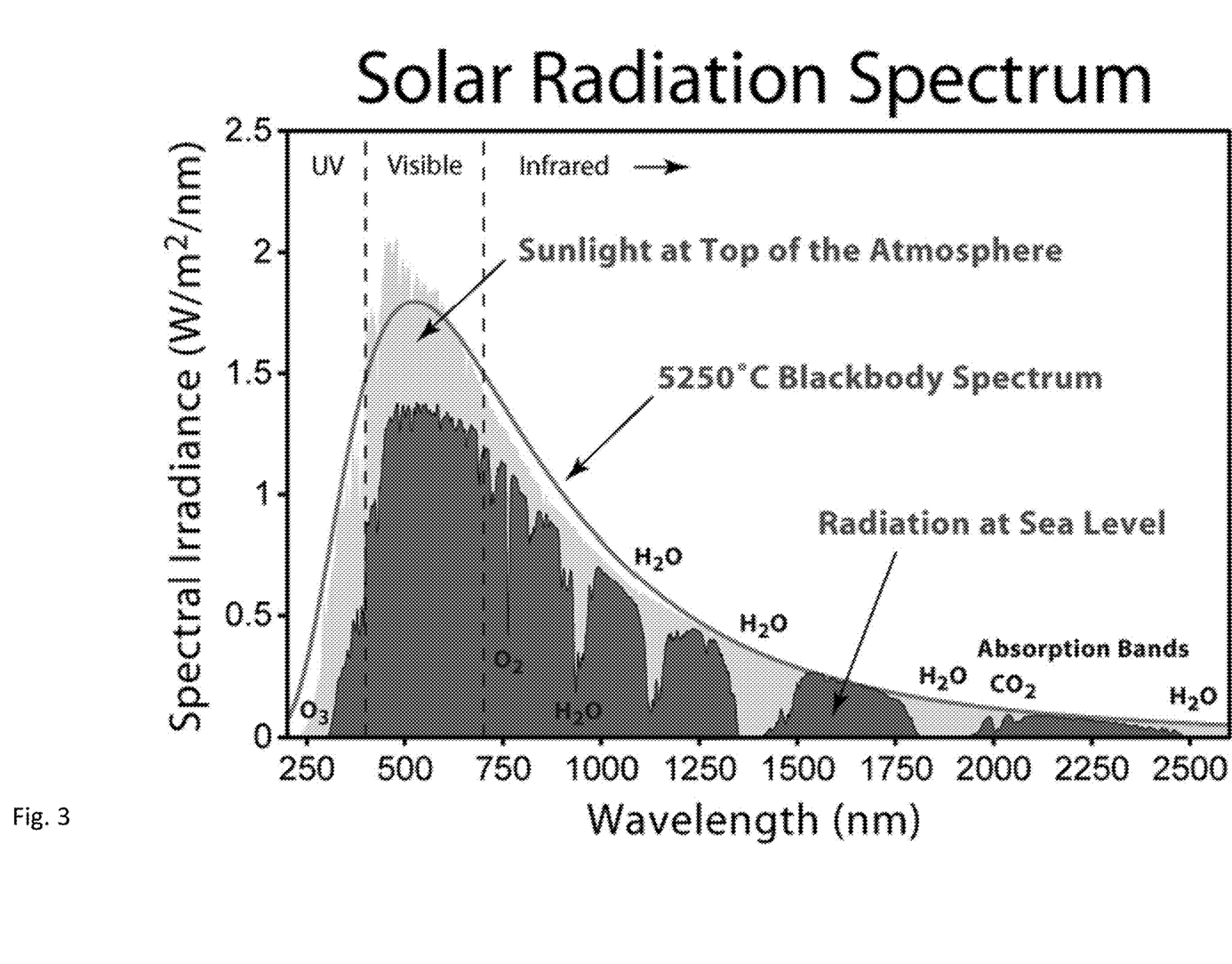
FIG. 3 illustrates an exemplary solar spectrum of spectral irradiance versus wavelength.
Figure 4:
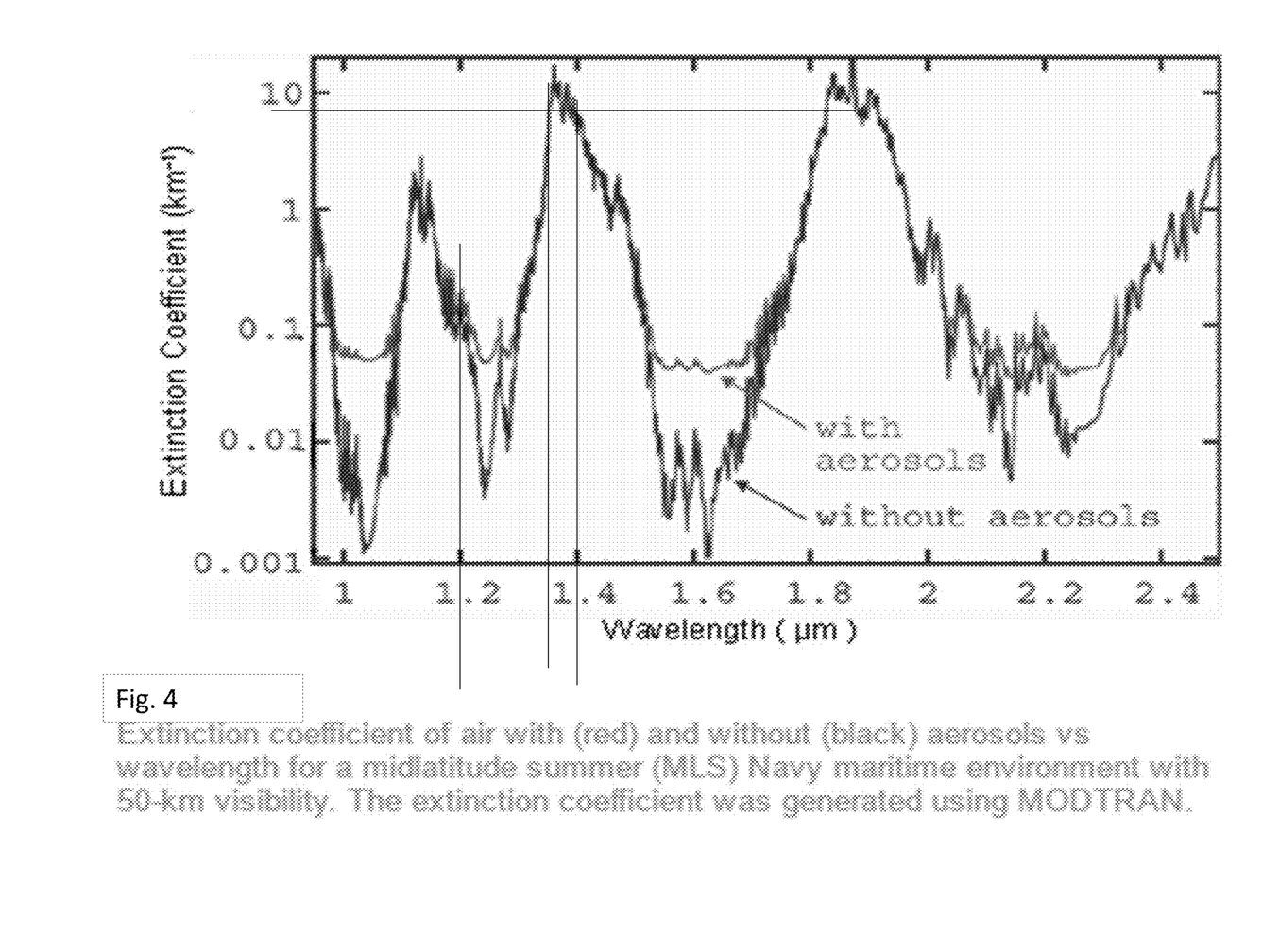
FIG. 4 illustrates an exemplary plot of extinction coefficients versus wavelength in air with and without aerosols.

As discussed above, while a larger optical aperture cross-section boosts the collection efficiency of scattered light, the larger cross-section also increases the amount of background light, and thus noise, entering the receiving system. Reducing the amount of background light can be accomplished by selecting a wavelength of the laser source and/or using a matched narrow band filter. Specifically, the wavelength of the laser source can be configured such that it falls into a band of atmosphere windows. FIG. 3 illustrates an exemplary solar spectrum of spectral irradiance versus wavelength, and FIG. 4 illustrates an exemplary plot of extinction coefficients versus wavelength in air with and without aerosols (e.g., fog). As an example, FIG. 3 shows that at 1.38 μm wavelength, the radiation at sea level is minimal. Similarly, FIG. 4 shows that at that wavelength, the extension coefficient is relatively low. Thus, at this wavelength, there is minimal background light, and thus noise, from sunlight in atmosphere near sea level. Thus, a 1.38 μm wavelength of a vapor absorption line can be selected as a laser working wavelength in this case.

Additionally or alternatively, a matched narrow band filter can be disposed in the receiving beam path to reduce the collection of lights that are not of the desirable wavelength(s). The matched narrow band filter can be an optical filter that rejects or substantially reduces background light. For example, the optical filter can be a bandpass filter such as a Lyot filter, a Fabry-Perot interferometer, or any other tunable filters.

In some embodiments, the MEMS beam steering apparatus can include a MEMS device that uses micro-mirrors. The MEMS mirror can steer the laser pulse generated by the laser source in two or three dimensions to illuminate objects in a field of view. It is appreciated that the MEMS beam steering apparatus can also include other MEMS components such as optical switches, optical cross-connects, lens, etc.

To enhance the visibility of the LiDAR system, the exemplary LiDAR system can further include a MEMS beam steering apparatus coupled with a fisheye wide angle receiving lens. In some embodiments, the fisheye wide angle receiving lens can be configured to collect scattered light generated from the pulses of light scattered at the objects. A fisheye lens can be a wide-angle lens that produces visual distortion intended to create a wide panoramic or hemispherical image. Thus, the fisheye lens can collect scattered light within a wide-angle, thereby enhancing or increasing the visibility of the LiDAR system. A fisheye lens can be, for example, a circular fisheye lens or a full-frame fisheye lens. In some embodiments, the fisheye lens's field of view can be selected or configured to match the field of view of the MEMS beam steering range. The fisheye wide angle receiving lens can be coupled to the MEMS beam steering apparatus, for example, side by side.

In some embodiments, the exemplary LiDAR system can also include a light detector to detect the light collected by the fisheye lens (and optionally filtered by the optical filter). In some instances, the detector's size can be quite significant comparing to the size of the beam spot. For example, the beam spot of a scattered light may be smaller than 100 micrometers, while the detector can have a size of a few millimeters in each dimension to cover the wide angle of field of view. In other words, the fisheye lens system can operate in a fairly under-fill scenario, in which the beam size of the received beam spot is much smaller compared with total detector active area. This may significantly increase detector noise and reduce signal-to-noise ratio. A large area of the detector may also introduce a large junction capacitance, which is proportional to the area of the detector. The large junction capacitance may slow down the amplifier and contribute to excess noise gain of a following transimpedance amplifier. Furthermore, the extra unilluminated area in the detector contributes nothing to signal but receiving large amount of background noise, thus increasing computational burden.

Figure 2:
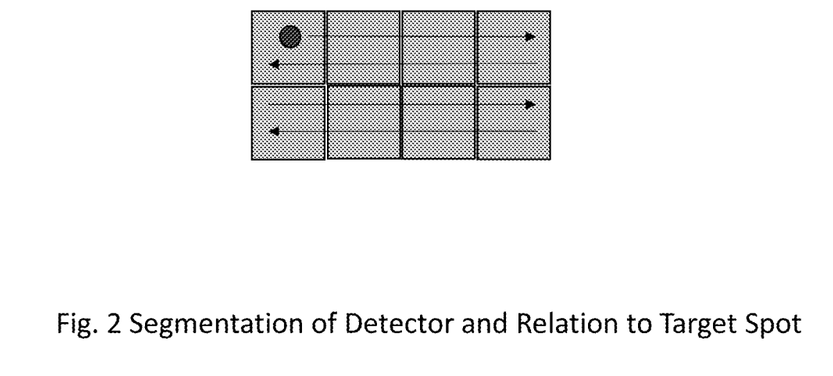
FIG. 2 illustrates an exemplary segmented detector and a received beam spot that moves through the detector's active areas, according to some embodiments of the disclosure.

FIG. 2 illustrates an exemplary segmented detector and a received beam spot that moves through the detector's active areas, according to some examples of the disclosure. As depicted, a light detector having a large active area can be divided into small segments (e.g., divided into a 2×3 or 2×4 array or other number of configurations of detector segments). It is appreciated that the light detector can be divided into any number of detector segments for balancing or optimizing the overall system performance. In some embodiments, each segment can have smaller junction capacitance and can be coupled to its dedicated transimpedance amplifier.

Figure 1:
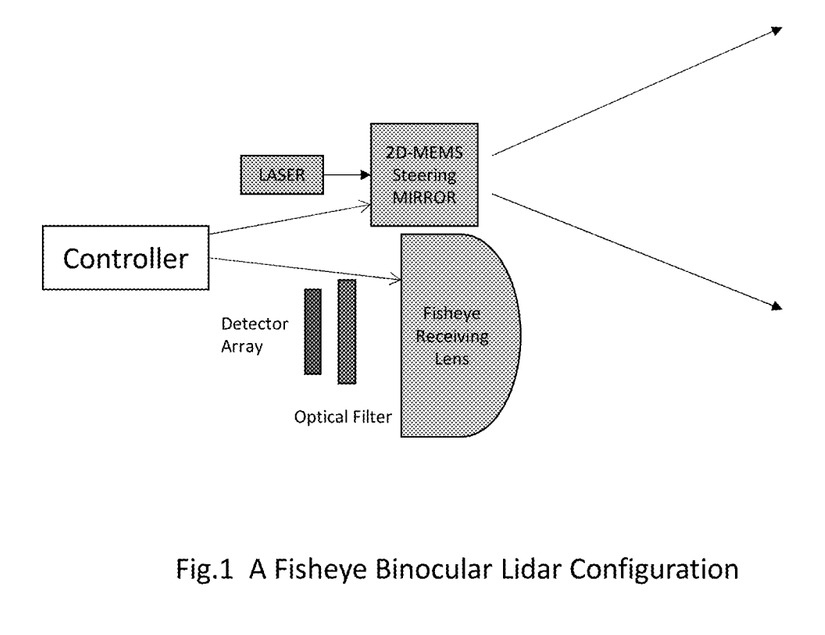
FIG. 1 illustrates an exemplary binocular LiDAR system with receiving fisheye lens and filter, according to some embodiments of the disclosure.

Each detector segment can be illuminated by a beam spot (e.g., received scattered light) corresponding to the beam steering angle or position of the MEMS beam steering apparatus. From the steering MEMS, a skilled artisan can determine which detector segment is to be illuminated and the LiDAR system can be focused on that segment of detector. For example, a skilled artisan can select the detector segment based on registration information from a MEMS steering mirror of the beam steering apparatus (e.g., position or pointing of the mirror). The extra cost to this solution is some extra transimpedance amplifier which may increase system cost slightly. In some examples, as shown in FIG. 1, the exemplary LiDAR system can further include a controller (e.g., one or more electrical processing and computing devices and memories) configured to coordinate between the MEMS beam steering apparatus and the activation of the detector elements such that only certain detector elements (e.g., a single detector element) are activated to receive the beam spot (e.g., scattered light from an object) corresponding to the steering angle or position of the MEMS steering apparatus. As illustrated in FIG. 2, for example, in the 2×4 detector array, some detector elements can be activated while the other detector elements are deactivated or turned off. As a result, junction capacitance of a detector can be significantly reduced and in turn, the signal-to-noise ratio can be improved. In some embodiments, the light detector can be implemented using an InGaAs-based detector (or array of detectors) and/or a SiGe-based detector.

In some examples, after determining which detector segment(s) are to be illuminated, the LiDAR system turns off (e.g., powers off) the rest of the detector segments on the detector array to save power and improve thermal management of the system if it is necessary (e.g., if the overall power consumption of the system exceeds a predetermined threshold). In some examples, the LiDAR system does not turn off the rest of the detector segments and allows all of the detector elements to detect collected scattered light. However, the system can forego processing the signals detected by the rest of the detector segments, thus reducing computational burden.

In some embodiments, an exemplary LiDAR system can further include a second detector configured to provide auto-balancing. For example, the second detector can have the same type or configuration as the first detector that detects the received scattered light generated by an object within the LiDAR's detection range (e.g., the detector described above). The second detector, however, can be configured to receive only background light or noise and provide the noise signal to the controller. In some examples, the system performs auto-balancing by automatically adjusting the ratio between the output caused by background light received by the first detector and the output caused by background light received by the second detector to be one or close to one. The controller can thus correlate the signals provided by the first and second detectors by, for example, subtracting the background noise signals provided by the second detector from the signal provided by the first detector (which includes both the scattered light generated by an object and the background noise). The auto-balancing can enhance the performance of the LiDAR system under certain conditions where the background noise may not be readily distinguished from the scattered light of an object. For example, during night time, many ambient lights are illuminating and thus background noise may include light at the laser wavelength used by the LiDAR system. As a result, absent of auto-balancing, the scattered light from an object may not be readily distinguished from ambient lights.

It should be appreciated that the receiving part of the exemplary LIDAR system described herein can have no moving parts. In other examples, moving parts may be included.

What is claimed is:

1. A light detection and ranging (LiDAR) scanning system, comprising:
    a light source configured to transmit a light pulse;
    a beam steering apparatus configured to steer the light pulse in at least one of vertical and horizontal directions along an optical path;
    a light converging apparatus configured to direct the collected scattered light to a focal plane;
    a light detector disposed at or in proximity to the focal plane, wherein the light detector comprises a plurality of detector segments; and
    an electrical processing and computing device configured to:
        obtain a subset of the plurality of detector segments;
        deactivate a particular detector segment of the plurality of detector segments, wherein the detector segment is not part of the subset of the plurality of detector segments; and
        detect, using the subset of the plurality of detector segments, a scattered light generated based on the light pulse illuminating an object in the optical path.

2. The LiDAR scanning system of claim 1, wherein the electrical processing and computing device is further configured to determine a distance to the object based on the scattered light detected by the subset of the plurality of detector segments.

3. The LiDAR scanning system of claim 2, wherein deactivating a particular detector segment comprises: powering off the particular detector segment.

4. The LiDAR scanning system of claim 2, wherein deactivating a particular detector segment comprises:
    detecting, using the particular detector segment, a scattered light; and
    foregoing determining a distance to the object based on the scattered light detected by the particular detector segment.

5. The LiDAR scanning system of claim 1, wherein the light source is a laser light source.

6. The LiDAR scanning system of claim 1, wherein the light source is configured to generate pulse signals of a predetermined wavelength range.

7. The LiDAR scanning system of claim 6, wherein the predetermined wavelength range falls into the band of atmosphere window.

8. The LiDAR scanning system of claim 6, further comprising an optical filter configured to filter pulse signals outside the predetermined wavelength range.

9. The LiDAR scanning system of claim 1, wherein the light converging apparatus comprises a wide angle receiving lens.

10. The LiDAR scanning system of claim 1, wherein the light detector is a first light detector, and wherein the LiDAR scanning system comprises a second light detector configured to receive background light.

11. The LiDAR scanning system of claim 10, the electrical processing and computing device is configured to reduce noise in a light signal received by the first light detector based on the background light received by the second light detector.

12. The LiDAR scanning system of claim 11, wherein reducing noise in the light signal received by the first light detector comprises adjusting a ratio between an output caused by background light received by the first light detector and an output caused by the background light received by the second light detector.

13. The LiDAR scanning system of claim 1, wherein the light converging apparatus is a 2D or 3D MEMS device.

14. The LiDAR scanning system of claim 1, wherein the beam steering apparatus comprises one or more micromirrors.

15. The LiDAR scanning system of claim 1, wherein the light converging apparatus comprises a fish eye lens.

16. A computer-implemented method for operating a light detection and ranging (LiDAR) system, the LiDAR system having a light source, a beam steering apparatus, and a light detector having a first detector segment and a second detector segment, the method comprising:
    transmitting, with the light source, a light pulse;
    steering, with the beam steering apparatus, the light pulse in at least one of vertical and horizontal directions along an optical path;
    directing, with the light converging apparatus, the collected scattered light to a focal plane;
    obtaining a subset of the plurality of detector segments; and
    detecting, using the subset of the plurality of detector segments, a scattered light generated based on the light pulse illuminating an object in the optical path.

* * * * *

UNITED STATES PATENT AND TRADEMARK OFFICE
CERTIFICATE OF CORRECTION

PATENT NO. : 11,009,605 B2
APPLICATION NO. : 15/857566
DATED : May 18, 2021
INVENTOR(S) : Yimin Li and Junwei Bao It is certified that error appears in the above-identified patent and that said Letters Patent is hereby corrected as shown below:

In the Claims

Column 6, Claim 1, Lines 36-37: "to direct the collected" should read --to direct a collected--

Column 6, Claim 1, Line 45: "wherein the detector" should read --wherein the particular detector--

Column 6, Claim 4, Line 63: "foregoing determining" should read --forgoing determining--

Column 7, Claim 7, Lines 5-6: "falls into the band of atmosphere" should read --falls into a band of an atmosphere--

Column 8, Claim 15, Line 9: "a fish eye lens" should read --a fisheye lens--

Column 8, Claim 16, Lines 19-20: "with the light converging apparatus, the collected" should read --with a light converging apparatus, a collected--

Column 8, Claim 16, Line 21: "subset of the plurality" should read --subset of a plurality--

Signed and Sealed this
Twenty-first Day of February, 2023

Katherine Kelly Vidal
*Director of the United States Patent and Trademark Office*